United States Patent [19]

Stickney

[11] Patent Number: 4,549,706
[45] Date of Patent: Oct. 29, 1985

[54] FLOW DATA SENSOR DUCT SYSTEM

[75] Inventor: Truman M. Stickney, Bloomington, Minn.

[73] Assignee: Rosemount Inc., Eden Praire, Minn.

[21] Appl. No.: 499,863

[22] Filed: Jun. 1, 1983

[51] Int. Cl.[4] ............................................. B64D 43/00
[52] U.S. Cl. .................................. 244/1 R; 244/129.1; 73/493; 73/861.61; 374/148; 374/208
[58] Field of Search ................. 244/129.1, 117 R, 1 R; 73/181, 180, 182, 183, 493, 178 R, 179, 178 H, 188, 189, 199, 216, 493, 861.01, 861.61, 861.62, 861.64, 861.65, 861.66, 861.67; 374/138, 141, 147, 148, 169, 208

[56] References Cited

U.S. PATENT DOCUMENTS

| | | | |
|---|---|---|---|
| 1,785,724 | 12/1930 | Brant | 244/1 R |
| 2,179,500 | 11/1939 | Diehl | 73/182 |
| 2,411,484 | 11/1946 | Watter | 73/182 |
| 2,588,840 | 3/1952 | Howland | 73/349 |
| 2,816,441 | 12/1957 | Ezekiel | 73/182 |
| 2,970,475 | 2/1961 | Werner | 73/339 |
| 2,971,997 | 2/1961 | Carrico | 136/4 |
| 3,000,213 | 9/1961 | Eves et al. | 374/138 |
| 3,075,387 | 1/1963 | Rademacher | 73/359 |
| 3,206,976 | 9/1965 | Gongwer | 73/182 |
| 3,216,258 | 11/1965 | Spencer et al. | 73/349 |
| 3,327,529 | 6/1967 | Bowles et al. | 73/180 |
| 3,512,414 | 5/1970 | Rees | 374/148 |
| 4,182,182 | 1/1980 | Stortz | 374/141 |
| 4,188,823 | 2/1980 | Hood | 73/147 |
| 4,197,737 | 4/1980 | Pittman | 73/178 |

Primary Examiner—Trygve M. Blix
Assistant Examiner—Rodney Corl
Attorney, Agent, or Firm—Kinney & Lange

[57] ABSTRACT

A non-intrusive duct system is disposed in a component of an air vehicle. The component has an external surface in a free stream flow. The duct system is disposed substantially flush with such external surface and is disposed with respect to the free stream flow to receive such flow. The duct system receives a portion of the free stream flow and conveys such portion through the duct system such that the portion bears a known relationship to the free stream flow. A flow data sensor for sensing a parameter of the portion of free stream flow is suitably disposed with respect to the duct system to be affected by the portion of flow therethrough and to sense such parameter. The duct system has a flow control apparatus disposed in the duct system to control the portion of flow such that the portion of flow is compatible with the sensing capabilities of the flow data sensor throughout the range of rates of free stream flow over which sensing of a parameter thereof is desired. In a preferred embodiment, the flow data sensor is a total temperature sensor.

20 Claims, 4 Drawing Figures

FLOW DATA SENSOR DUCT SYSTEM

BACKGROUND OF THE INVENTION

1. Field of the Invention

The present invention relates generally to a system for conveying flow from a free steam flow to a flow data sensor. Specifically it is a flush mounted or non-intrusive duct system that provides the flow to a flow data sensor mounted internal to a component of an air vehicle in the free stream flow.

2. Description of the Prior Art

Flow data sensors have been widely used on modern high performance air vehicles, comprising aircraft, missiles and other devices having flow data sensors in a free stream flow. Heretofore, they have generally comprised intrusive probes, that is probes which project into the free stream flow. Such probes generally cause undesirable magnitudes of aerodynamic drag and radar cross section or reflectivity and are prone to damage during aircraft ground handling.

Accordingly, an advantage of the present invention is to facilitate sensing of flow data with a non-intrusive apparatus such that reduction in aerodynamic drag and radar reflectivity is realized.

SUMMARY OF THE INVENTION

The present invention relates to a non-intrusive duct system for conveying a portion of flow from a free stream flow to affect a flow data sensor. The duct system is disposed in a component of an air vehicle. The component has an external surface in a free stream flow. The duct system is disposed substantially flush with such external surface and disposed with respect to the free stream flow to receive such flow. The duct system receives a portion of the free stream flow and conveys such portion through the duct system such that the portion bears a known relationship to the free stream flow. A flow data sensor for sensing a parameter is suitably disposed with respect to the duct system to sense such parameter. In a preferred embodiment, the flow data sensor is a total temperature sensor. The duct system has a flow control apparatus disposed in the duct system to control the portion of flow in the duct system so that such portion of flow is compatible with the sensing capabilities of the flow data sensor throughout the range of rates of free stream flow over which sensing of a parameter thereof is desired.

In one embodiment, the duct system is disposed in a housing. The housing has an external surface conforming to a portion of the external surface of the air vehicle component and forms a substantially uninterrupted contoured surface therewith.

DESCRIPTION OF THE PREFERRED EMBODIMENTS

Figure 1:
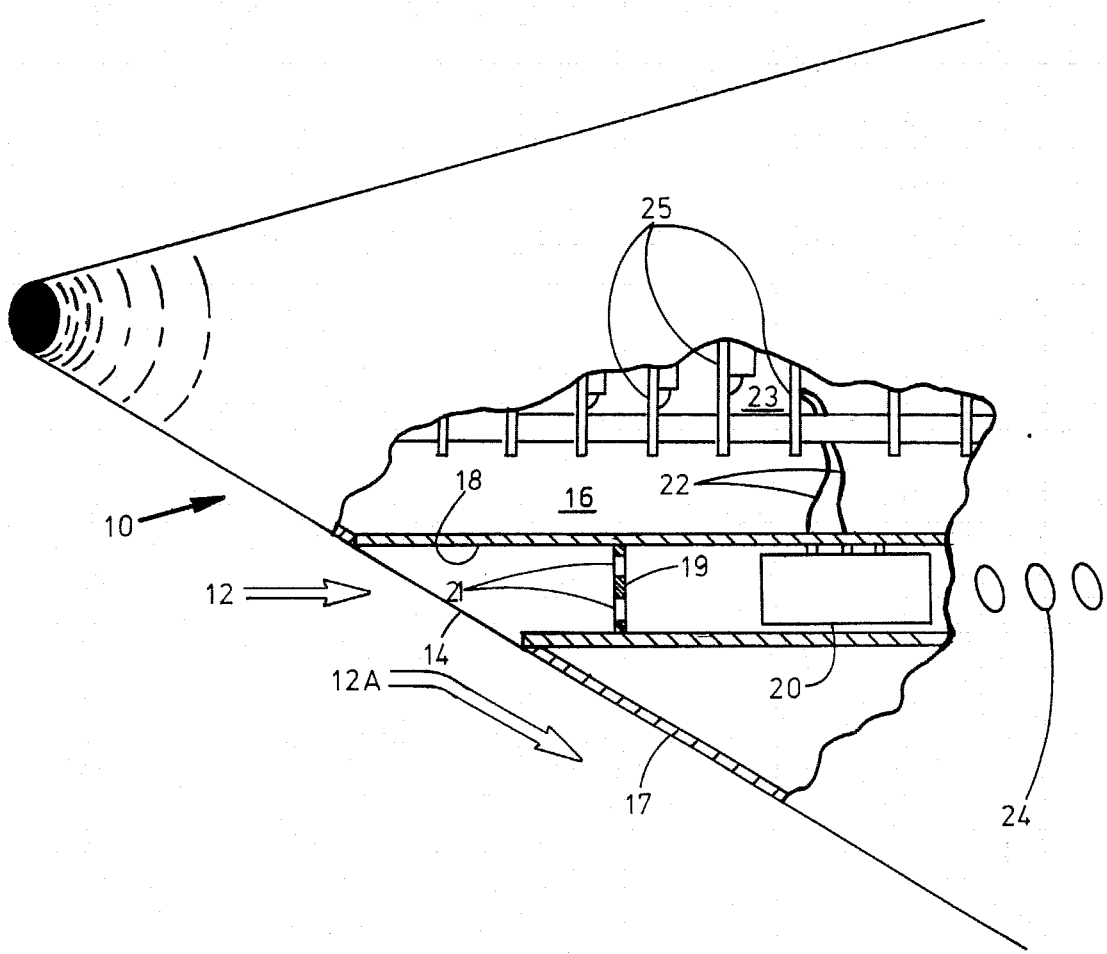
FIG. 1 is a partially cutaway view of an air vehicle structure incorporating a sectional view of the duct system with an impact covering installed.
Figure 2:
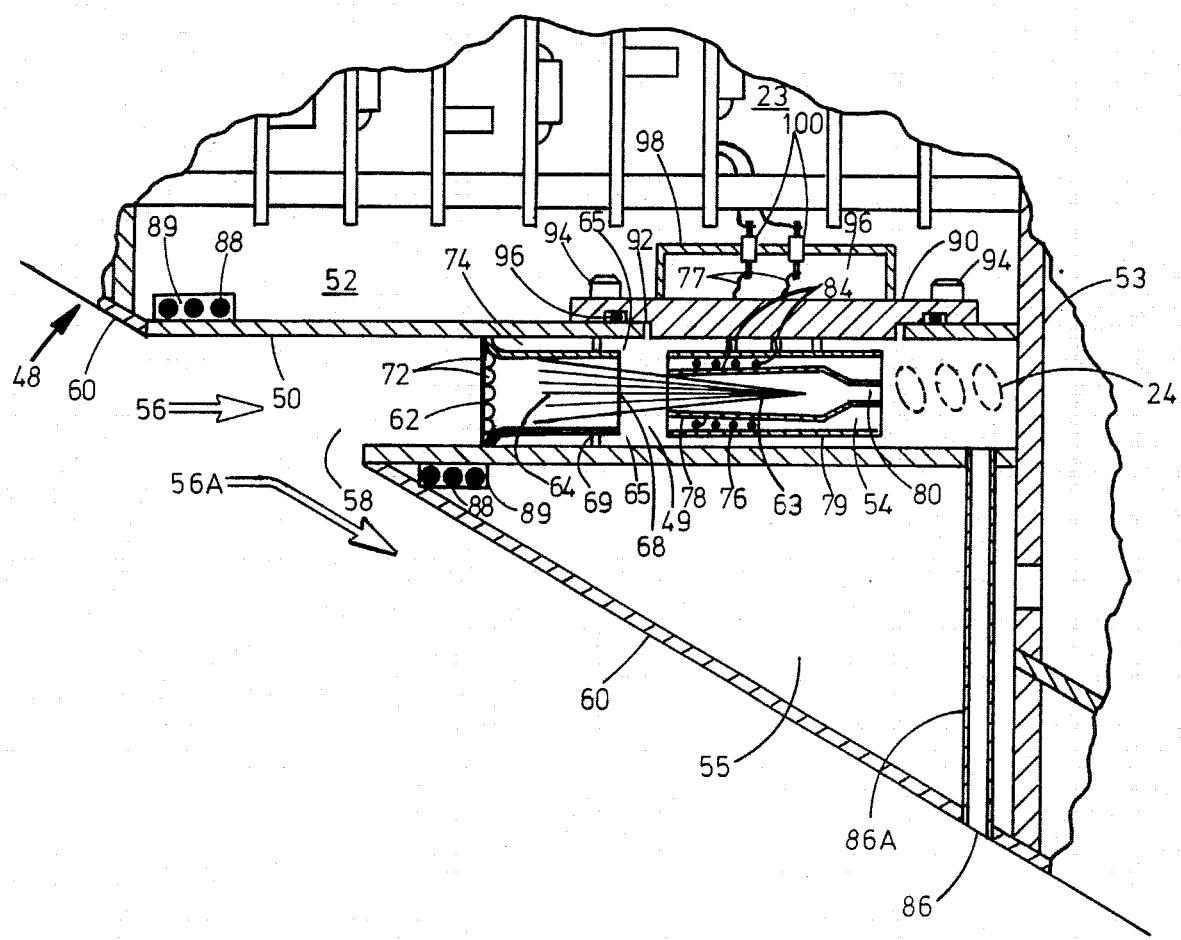
FIG. 2 is a sectional view of a preferred embodiment of the invention showing a conduit and nozzle type non-intrusive device in a cut away portion of a component of an air vehicle.

FIGS. 1 and 2 show components 10 and 48 respectively of an air vehicle. The air vehicle can be any airborne device on which it is desirable to sense a free stream flow parameter. The air vehicle can be powered or unpowered, guided or unguided, piloted or unpiloted. It is understood that components 10 and 48 could be a structural component such as a nosecone, wing, tail, empenage, fuselage, fin, strake, pylon, engine inlet, cowling or other member of the air vehicle. It could additionally be a body in a free stream where the free stream is in a wind tunnel or simply natural wind. In the preferred embodiments shown, air vehicle components 10 and 48 are a nosecone of a relatively small air vehicle such as a missile.

In FIG. 1, the free stream flow is shown by arrows 12 and 12A to the left of component 10. Free stream flow passes around component 10 as shown by arrow 12A. A portion of the free stream flow as represented by arrow 12 enters intake opening 14 of duct system 16. Intake opening 14 is substantially flush with a portion of external surface 17 of component 10 and comprises an end of conduit 18. Conduit 18 conveys portion 12 of such flow to affect flow data sensor 20. In the embodiment shown, flow data sensor 20 is a total temperature sensor and is mounted in conduit 18. However, there are a number of different flow parameters that may be desired to be sensed. For each such parameter there are a number of different embodiments of a flow data sensor that satisfactorily senses such parameter. It is understood that flow data sensor 20 may be any one of such embodiments.

Typical parameters desired to be sensed include total temperature, pitot pressure, static pressure, flight mach number, angle of attack, and conditions of icing. Such parameters are as generally understood in the aeronautical engineering discipline and may be defined as follows:

Total Temperature. The temperature a moving fluid would have if it were brought to rest without losses or additions of heat, ie. isentropic.

Pitot Pressure. The pressure a moving fluid would have if it were brought to rest without losses, i.e. stagnation pressure.

Static Pressure. The undisturbed ambient pressure of the air through which the air vehicle is passing.

Flight Mach Number. Air vehicle speed expressed as a ratio with respect to the speed of sound at flight altitude.

Angle of Attack. The acute angle of an aircraft measured in the XZ plane (body axis coordinate system) between the X axis and the projection of the resultant flight velocity vector in the XZ plane. It is positive when the flight velocity vector impinges from below the aircraft. The body axis coordinate system is a right hand orthogonal system of aircraft body axes originating at the center of gravity of the aircraft. The X and Z axis are in the plane of symmetry, positive forward and downward, respectively.

Duct system 16 conveys the flow parameter to be sensed to flow data sensor 20 in such a manner that it bears a known relationship to such parameter in its free stream flow condition. Accordingly, flow data sensor 20 may be mounted in other ways such that the known relationship to the sensed parameter is produced; as for example, in a manner internal to conduit 18 other than as shown in FIG. 1, flush in conduit 18, external to conduit 18.

Data on the sensed parameter are communicated from flow data sensor 20 through a pair of lead wires 22 for utilization in air vehicle system 23, which may be an air data computer, electrical circuitry, suitable instrumentation and read out means or the like. As shown, air vehicle system 23 is comprised of a series of circuit boards 25 electrically connected and disposed in air vehicle component 10.

Conduit 18 is connected downstream to exhaust ports 24. Exhaust ports 24 are preferably disposed substantially flush with external surface 17 of air vehicle component 10. Exhaust ports 24 are shown where they are preferably located on external surface 17. They are connected by suitable ducts to conduit 18. Portion 12 of the free stream flow exits duct system 16 at exhaust ports 24.

In a preferred embodiment, exhaust ports 24 are located on external surface 17 of component 10 in a region where the flow pressure is less than the flow pressure at intake opening 14 under normal conditions of flow. Since flow normally occurs from an area of high pressure to an area of lower pressure, such difference in pressure assists in maintaining flow through duct system 16 and assists in ensuring that portion 12 of the free stream flow is compatible with the sensing capabilities of the flow data sensor.

Where desired, an impact covering is disposed in conduit 18. In the embodiment shown, impact disc 19 comprises the impact covering. The perimeter of impact disc 19 is coterminus with the inside diameter of conduit 18. Preferably, impact disc 19 has a plurality of passageways 21 therethrough. Impact disc 19 functions to control flow through conduit 18, to reduce the radar reflectivity caused by duct system 16 in that, as shown, where it is positioned close to the inlet of duct system 16, it effectively reduces the size of the opening that is presented to radar emissions. The disc 19 also is useful to prevent larger particulate contaminants in the free stream flow from entering duct system 16. Such functions are explained in more detail in the description of FIG. 3.

In another preferred embodiment, the cross sectional area of exhaust ports 24 is less than the cross sectional area of the opening to the free stream flow. Such opening is comprised of the cross sectional area of intake opening 14 or, where impact disc 19 is utilized, is comprised of the sum of the cross sectional areas of passageways 21. Such reduced area or restriction in exhaust ports 24 controls flow by creating a back pressure that reduces the rate of flow through conduit 18. A reduced rate of flow is desirable to ensure compatibility with the sensing capabilities of some types of flow data sensors that are utilized in conjunction with duct system 16.

Where duct system 16 is to be utilized in supersonic free stream flow, a restriction in exhaust ports 24 is effective in causing a shock wave to stand outside of intake opening 14, by creating an area of increased pressure in intake opening 14. It is known that supersonic flow decelerates to subsonic flow behind a shock wave. This ensures subsonic flow in duct system 16 which is desirable to ensure compatibility with the sensing capabilities of many types of flow data sensors. It is known that the flow parameters of such subsonic flow bears a certain relationship to the flow parameters of the supersonic free stream flow. Where the free stream flow is subsonic, flow in duct system 16 will be subsonic and a restriction in exhaust port 24 will not substantially affect the relationship of the flow parameters of portion 12 of the free stream flow to the flow parameters of the free stream flow.

In the embodiment shown in FIG. 2, duct system 52 is disposed in cavity 55. Cavity 55 is formed in part by external surface 60 of air vehicle component 48, conduit 50 and bulkhead 53. Cavity 55 may also be a defined by a housing enclosing duct system 52 in air vehicle component 48.

In operation, the free stream flow passes around air vehicle component 48 as shown by arrow 56A. A portion of such flow represented by arrow 56 enters opening 58 of conduit 50. Opening 58 is preferably flush with external surface 60 of air vehicle component 48. As portion 56 of the free stream flow proceeds through conduit 50, such portion 56 enters flared intake opening 62 of nozzle 64, which is disposed in conduit 50. In the preferred embodiment shown, nozzle 64 is affixed to conduit 50 at concave, convergent intake opening 62 as by brazing or other bonding means to conduit 50 and by struts 69 located near exhaust opening 68. Nozzle 64 accelerates portion 56 of the free stream flow as portion 56 passes through nozzle 64 and exhausts portion 56 from exhaust opening 68 into chamber 49. Chamber 49 is defined by the inner surface of the portion of conduit 50 that is downstream of nozzle 64 and by bulkhead 53.

As portion 56 of free stream flow proceeds through conduit 50, the layer of such portion 56 proximate to the inside surface of conduit 50 is affected by such surface and comprises boundary layer flow. Such boundary layer flow may not be fully representative of the flow parameters as they exist in free stream flow. Accordingly, in a preferred embodiment, boundary layer control means are incorporated at intake opening 62 as desired. In the preferred embodiment shown the boundary layer control means comprise a series of semi-circular slots 72 disposed in intake opening 62 proximate to the inner surface of conduit 50 and passing through intake opening 62. Slots 72 comprise flow passageways through intake opening 62 and open into annular passageway 74 formed by conduit 50 and nozzle 64. Slots 72 bleed off boundary layer flow through slots 72 to bypass intake opening 62 and direct such flow through annular passageway 74 to exhaust into chamber 49 through annular opening 65. Annular opening 65 is cooperatively formed by nozzle 64 and conduit 50 annular to nozzle 64. Boundary layer flow is directed so as to avoid direct impingement on flow data sensor 54.

Portion 56 of free stream flow exiting exhaust opening 68 defines a substantially isentropic flow cone 63 as a function of the acceleration caused by nozzle 64. Typically such cone 63 has a length equal to approximately four times the diameter of exhaust opening 68. Flow data sensor 54 is so located with respect to duct system 52 such that isentropic flow cone 63 impinges on flow data sensor 54. Such isentropic flow enhances the relationship of the total temperature flow parameter of portion 56 of the free stream flow to such parameter as it exists in free stream flow. Accordingly, the total temperature data obtained by flow data sensor 54 is enhanced where such sensor 54 is affected by the isentropic flow.

It is understood that, as indicated in the description of FIG. 1, flow data sensor 54 can take a variety of forms depending on the flow parameter desired to be sensed and the type of sensor selected appropriate to such parameter. As indicated above, in the embodiment shown in FIG. 2, flow data sensor 54 comprises a total temperature sensor and has sensor element 76 wound in thin wall bore 78 which is disposed inside outer wall 79 of flow data sensor 54. Data are taken from sensor element 76 at leads 77 for use in air vehicle system 23 such as described for FIG. 1.

It is known that certain types of flow data sensors require a relatively slow rate of flow to function satisfactorily even when the air vehicle is operated at high speeds. Accordingly, a throat 80 may be incorporated in thin wall bore 78, where required to reduce flow velocity. Alternatively, a throat or restriction may be incorporated in exhaust ports 24, as desired.

Exhaust ports 24 are connected by suitable ducts to conduit 50 as was explained for FIG. 1. In the embodiment shown in FIG. 2, such ducts are connected to conduit 50 on the side of duct system 52 that is not shown due to the sectioned representation. However, for clarity of understanding, they are shown as dashed lines where they should appear connected to the side of conduit 50. A restriction in exhaust ports 24 functions to increase the pressure in chamber 49 and thereby reduce the rate of flow through duct system 52. Such increased pressure is additionally effective in causing a shock wave to stand outside opening 58 where the free stream flow is supersonic, thus ensuring subsonic flow to flow data sensor 54. It is known that the parameters of such subsonic flow bear a certain relationship to the parameters of the supersonic free stream flow. Where the free stream flow is subsonic, portion 56 of the free stream flow in duct system 52 will also be subsonic. It is known that the previously described restrictions and throats do not substantially affect the relationship of the flow parameters of portion 56 of the free stream flow to such parameters as they exist in the subsonic free stream flow.

Flow data sensor 54 is shown mounted to conduit insert 90 by struts 84. In the preferred embodiment shown, lead wires 77 are passed through struts 84. Conduit insert 90 is disposed in opening 92 in conduit 50 and held in place by fasteners 94. Such mechanization facilitates easy removal and replacement of flow data sensor 54. To maintain watertight integrity of cavity 55, seal 96 is interposed between conduit insert 90 and conduit 50. Such seal 96 prevents water that may enter duct system 52 from entering cavity 55. To additionally insure watertight integrity, watertight chamber 96 is formed by chamber wall 98 affixed to conduit insert 90. Watertight feedthrough devices 100 provide a watertight passage of lead wires 77 into cavity 55. It is understood that there are a myriad of ways that flow data sensor 54 could be mounted so that it receives the flow from nozzle 64. Significantly, flow data sensor 54 need not be constructed specially to account for the differing aerodynamics of each application of the device, but can be a single configuration suitable for applications in a variety of air vehicles and air vehicle components.

Exhaust ports 24 are connected to chamber 49 by ducts connected to conduit 50 and opening into chamber 49. Exhaust ports 24 scavenge portion 56 of the free stream flow in chamber 49 and exhaust it to the flow outside of and around air vehicle component 48. Preferably, exhaust ports 24 are located with respect to air vehicle component 48 where the pressure in the vicinity of exhaust ports 24 is less than the pressure at opening 58 of duct system 52 for all desired rates of free stream flow. It is known that flow occurs from an area of high pressure to an area of lower pressure. By so locating exhaust ports 24, flow is, in effect, drawn from chamber 49. This drawing effect is especially desired where the rate of free stream flow is slow and heaters, such as heater 88, are desired. It is known that to prevent such heater from affecting the total temperature of portion 56 of the free stream flow in conduit 50, the rate of flow in conduit 50 is preferably kept above 0.3 Mach. The drawing effect assists in maintaining such rate of flow without substantially affecting the parameters of portion 56 of the free stream flow as such parameters exist in the free stream flow.

Where desired, drain port 86 is included and is connected to chamber 49 by tube 86A. In operation, water droplets entering chamber 49 in portion 56 of the free stream flow accumulate in the vicinity of the connection to tube 86A and flow therethrough and out of drain port 86. Pressure in chamber 49 assists in expelling the water. It has been found that drain port 86 may be a very small port and still adequately expel accumulated water.

The embodiment in FIG. 2 further includes heater 88. Such heater is incorporated, where desired, to provide de-ice, or anti-ice capability for duct system 52. As shown, heater 88 is a resistive wire wound around conduit 50 and enclosed in sheath 89. Heater 88 is suitably spaced to de-ice or anti-ice both opening 58 and intake opening 62 as desired. Sheath 89 may be ceramic material or the like. It is understood that the heater may have other suitable embodiments in addition to resistive wire, such as ducted hot engine bleed air and positive temperature coefficient (PTC) material.

Figure 3:
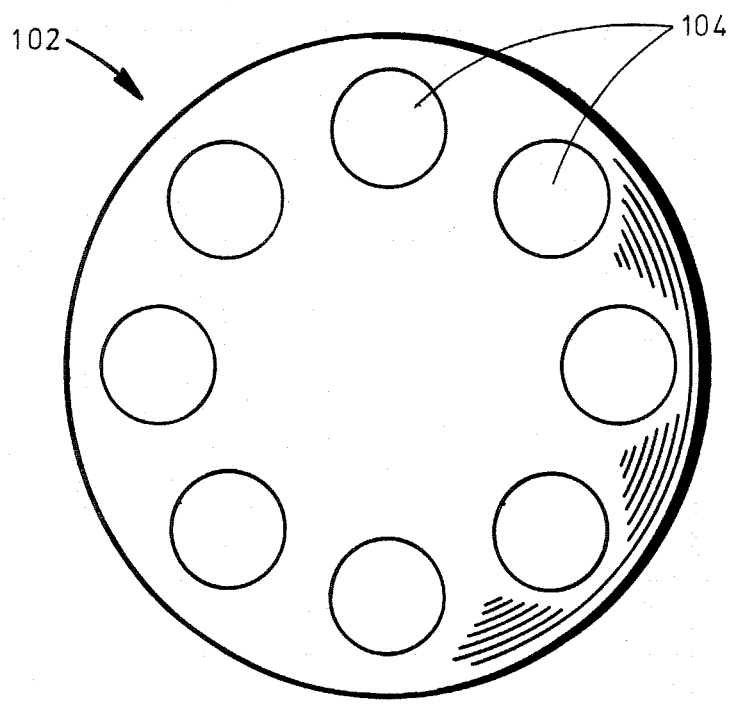
FIG. 3 is a front view of one embodiment of an impact covering for the duct system.

FIG. 3 shows an embodiment of an impact covering comprising impact disc 102 having a plurality of flow passageways 104 therethrough. Impact disc 102 is constructed as to fit securely in and be substantially coterminus with intake opening 14 of FIG. 1 and opening 58 of FIG. 2. Impact disc 102 is shown as impact disc 19 in FIG. 1. When disposed in opening 14 or opening 58, impact disc 102 contributes to flow control and reduced radar reflectivity by effectively reducing the size of the opening that is presented to both the free stream flow and to radar emissions illuminating the air vehicle. Additionally, impact disc 102 stops larger particulate contaminants in the free stream flow from entering the duct system. This is particularly significant for air vehicles that operate at low altitudes where larger contaminates in the free stream flow, such as insects and the like, are more frequently encountered.

In a preferred embodiment, impact disc 102 is constructed with eight flow passageways 104 therethrough. In an additional preferred embodiment, each such passageway 104 is less than 0.476 cm in diameter. Such size is effective in minimizing reflectivity of certain radar frequencies.

To enhance flow through the duct system to ensure compatibility with the sensing capabilities of the flow data sensor, the area through which flow enters the duct system should exceed the sum of the areas through which flow can exit the duct system. This contributes to maintaining a positive pressure upstream in the duct system with respect to the downstream pressure. For example, when impact disc 102 is utilized with the embodiment shown in FIG. 2, the sum of the areas of flow passageways 104 comprises the intake area. As previously indicated in the comments on FIG. 2, portion 56 of the free stream flow exits duct system 52 either as boundary layer flow through semi-circular slots 72 or through exhaust opening 68. Accordingly, in this embodiment the exit area consists of the sum of the boundary layer control areas, i.e., the areas of semi-circular slots 72, added to the area of exhaust opening 68.

Where the flow data sensor comprises a total temperature sensor, as shown by flow data sensor 54 in FIG. 2, impact disc 102 is constructed such that it is a thermal insulator and has a low thermal mass, thus ensuring that the total temperature of portion 56 of the free stream flow that passes through impact disc 102 remains substantially representative of the free stream flow characteristics.

Figure 4:
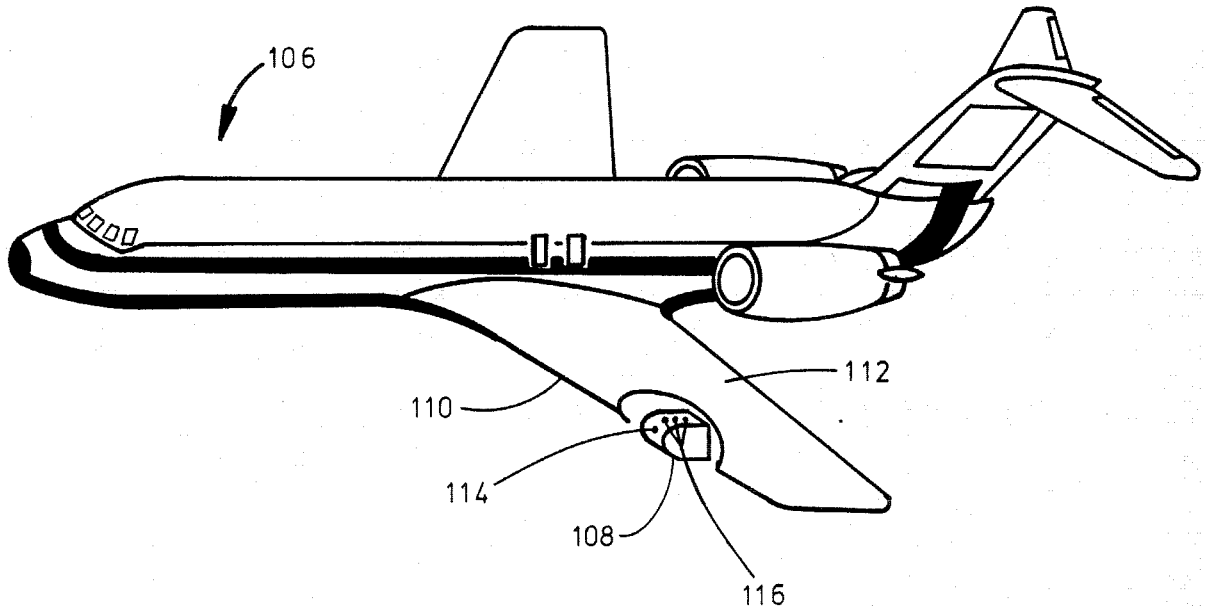
FIG. 4 is a perspective view of an air vehicle incorporating the duct system in a housing in the wing leading edge. The invention is positioned with respect to the wing and is shown with the surrounding wing structure broken away.

In the embodiment shown in FIG. 4, housing 108 is exaggerated in size with respect to the air vehicle component, wing 112, for ease of understanding. The figure is not intended to represent an actual physical size relationship of housing 108 and such component. It is understood that in a preferred embodiment the duct system may occupy a volume no greater than 500 cubic centimeters whereas the chord of a wing in which the duct system is installed may be 15 meters or more in length.

FIG. 4 shows air vehicle 106 with housing 108 disposed in wing 112. Housing 108 is constructed to conform to the contour of leading edge 110 of wing 112, thereby forming a substantially uninterrupted, contoured external surface therewith. The figure demonstrates the functional relationship between housing 108 and the component of the air vehicle, wing 112, as regards the preferred location of the various openings and ports. Housing 108 preferably contains the previously recited apparatus of the invention. For example, housing 108 contains duct system 52 substantially as shown in FIG. 2. Opening 114 and exhaust ports 116, corresponding to opening 58 and exhaust ports 24 respectively in FIG. 2, are shown. Opening 114 and exhaust ports 116 are flush with the portion of the external surface of housing 108 that is exposed to the free stream flow. Opening 114 is additionally so disposed in housing 108 as to receive a portion of the free stream flow.

The advantage of the embodiment in FIG. 4 is that for ease of maintenance, housing 108 may be removed from the air vehicle and a similar unit substituted in its place. Feedthrough devices are required in housing 108 to provide power to certain flow stream sensors and the heaters and to receive data from the flow stream sensors. Such feedthrough devices are usually incorporated in known quick disconnect type connectors for ease of removal and installation of housing 108. It is understood that housing 108 may also be constructed to conform to a portion of any of the components of the air vehicle detailed in conjunction with the description of FIG. 1 in order to form a substantially uninterrupted, contoured external surface therewith.

It is apparent that many modifications and variations of this invention as set forth herein may be made without departing from the spirit and scope hereof. The specific embodiments are given by way of example only and the invention is limited only by the terms of the appended claims.

What is claimed is:

1. For use in an air vehicle including an air vehicle component forming a portion of the air vehicle structure and being other than an air data sensor protruding from the air vehicle external surface, the component having an external surface, a portion of which external surface is exposed to a free stream flow, the improvement comprising non-intrusive duct system means within the external surface boundries of the air vehicle component for conveying a portion of such free stream flow and a flow data sensor suitably disposed with respect to the duct system means within the external surface boundries of the air vehicle component to sense a parameter of such portion of free stream flow, the duct system means comprising:

conduit means having an opening through the external surface to the free stream flow for receiving a portion of flow therefrom and the means defining the opening being substantially flush with the portion of the external surface of the air vehicle component which is exposed to the free stream flow and for directing such portion of flow to affect the flow data sensor such that the portion of flow bears a known relationship to the flow parameter to be sensed as it exists in free stream flow, flow control means comprising nozzle means disposed in the duct system means for controlling the portion of free stream flow in the conduit means so that such portion of free stream flow is compatible with the sensing capabilities of the flow data sensor throughout the range of rates of free stream flow over which sensing of a parameter thereof is desired; and boundary layer control means disposed in the nozzle means for bleeding off boundary layer flow such that the boundary layer flow does not affect the flow data sensor, the boundary layer flow consisting of the layer of the portion of free stream flow in the conduit means that is proximate to the conduit means and affected thereby.

2. The device of claim 1 wherein the nozzle means has intake opening means for capturing the flow in the conduit means comprising a concave convergent opening connected at its periphery to the conduit means and exhaust opening means downstream of the intake opening means and connected thereto for discharging the accelerated portion of free stream flow.

3. The device of claim 2 wherein the boundary layer control means comprise slot means passing through the periphery of the nozzle intake means for bleeding the boundary layer air therethrough and thereby bypassing the nozzle means.

4. Duct system means as claimed in claim 2 wherein the ratio of the cross-sectional area of the opening to the free stream flow of the conduit means to the sum of the cross-sectional area of the boundary layer control means plus the cross-sectional area of the exhaust opening means of the nozzle means is greater than one.

5. The device of claim 1 having exhaust port means for exhausting the portion of the free stream flow from the duct system means, the exhaust port means disposed in the portion of the external surface of the air vehicle component exposed to the free stream flow so as to direct the portion of the free stream flow therethrough, such disposition being substantially flush with the external surface of the air vehicle component.

6. The device of claim 5 wherein the exhaust port means comprises restriction means for effecting flow control in the duct system means by reducing the flow therethrough.

7. The device of claim 5 wherein the exhaust port means are so located in the portion of the external surface of the air vehicle component exposed to the free stream flow that at all rates of free stream flow for which flow parameter sensing is desired, the pressure at the exhaust port means is less than the pressure at the conduit means opening to the free stream flow, such pressure differential for inducing flow through the conduit means.

8. Duct system means as claimed in claim 1 wherein the air vehicle component is selected from the group consisting of a nosecone, wing, tail, empenage, fuselage, fin, strake, pylon, engine inlet and a engine cowling.

9. Duct system means as claimed in claim 1 wherein heating means are provided for anti-icing and de-icing the duct system means.

10. Duct system means as claimed in claim 9 wherein the heating means comprise resistive wire wound around the conduit means proximate to the opening to the free stream flow.

11. Non-intrusive duct system means disposed in an air vehicle structural component having an external surface, a portion of which external surface is exposed to a free stream flow, the duct system means conveying a portion of such flow and a flow data sensor suitably disposed with respect to the duct system means to sense a parameter of such portion, the duct system means comprising:

housing means for installation within the air vehicle component and having an external surface a portion of which is exposed to the free stream flow, which portion is conformal with the external surface of the air vehicle component in which it is installed for forming a substantially uninterrupted contoured surface therewith and defining an interior cavity, conduit means disosed in the interior cavity and having an opening to the free stream flow for receiving a portion of flow therefrom, the end of the conduit defining the opening being disposed substantially flush with the portion of the external surface of the housing which is exposed to the free stream flow, and the conduit means directing such portion of flow to affect the flow data sensor such that the portion of flow bears a known relationship to the flow parameter to be sensed as it exists in free stream flow, flow control means comprising nozzle means disposed in the duct system means for controlling the portion of free stream flow in the conduit means so that such portion of free stream flow is compatible with the sensing capabilities of the flow data sensor throughout the range of rates of free stream flow over which sensing of a parameter thereof is desired; and boundary layer control means disposed in the nozzle means for bleeding off boundary layer flow such that the boundary layer flow does not affect the flow data sensor, the boundary layer flow consisting of the layer of the portion of the free stream flow in the conduit means that is proximate to the conduit means and affected thereby.

12. The device of claim 11 wherein the nozzle means has intake opening means for capturing the flow in the conduit means comprising a concave convergent opening connected at its periphery to the conduit means and exhaust opening means downstream of the intake opening means and connected thereto for discharging the accelerated portion of free stream flow.

13. The device of claim 12 wherein the boundary layer control means comprise slot means passing through the periphery of the nozzle intake means for bleeding the boundary layer air therethrough and thereby bypassing the nozzle means.

14. Duct system means as claimed in claim 12 wherein the ratio of the cross-sectional area of the opening to the free stream flow of the conduit means to the sum of the cross-sectional area of the boundary layer control means plus the cross-sectional area of the exhaust opening means of the nozzle means is greater than one.

15. The device of claim 11 having exhaust port means for exhausting the portion of the free stream flow from the duct system means the exhaust port means disposed in the portion of the external surface of the housing means that is exposed to the free stream flow so as to direct the portion of the free stream flow therethrough such disposition being substantially flush with the external surface of the housing means.

16. The device of claim 15 wherein the exhaust port means comprises restriction means for effecting flow control in the duct system means by reducing the flow therethrough.

17. The device of claim 16 wherein the exhaust port means are so located in the portion of the external surface of the housing means that is exposed to the free stream flow that at all rates of free stream flow for which flow parameter sensing is desired, the pressure at the exhaust port means is less than the pressure at the conduit means opening to the free stream flow, such pressure differential for inducing flow through the conduit means.

18. Duct system means as claimed in claim 11 wherein the air vehicle component is selected from the group consisting of a nosecone, wing, tail, empenage, fuselage, fin, strake, pylon, engine inlet and an engine cowling.

19. Duct system means as claimed in claim 11 wherein heating means are provided for anti-icing and de-icing the duct system means.

20. Duct system means as claimed in claim 19 wherein the heating means comprise resistive wire wound around the conduit means proximate to the opening to the free stream flow.

* * * * *

UNITED STATES PATENT AND TRADEMARK OFFICE
CERTIFICATE OF CORRECTION

PATENT NO. : 4,549,706

DATED : October 29, 1985

INVENTOR(S) : Truman M. Stickney

It is certified that error appears in the above-identified patent and that said Letters Patent is hereby corrected as shown below:

In column 8, line 3, "boundries" should be spelled --boundaries--.

In column 8, line 7, "boundries" should be spelled --boundaries--.

In column 9, line 33, "disosed" should be spelled --disposed--.

Signed and Sealed this

Twenty-fifth Day of February 1986

[SEAL]

Attest:

DONALD J. QUIGG

Attesting Officer     Commissioner of Patents and Trademarks